Jan. 21, 1964 E. JABLONSKY 3,118,310
CRANK MECHANISM FOR MANUAL OR POWER BOOST STEERING ARRANGEMENTS
Filed Nov. 14, 1960
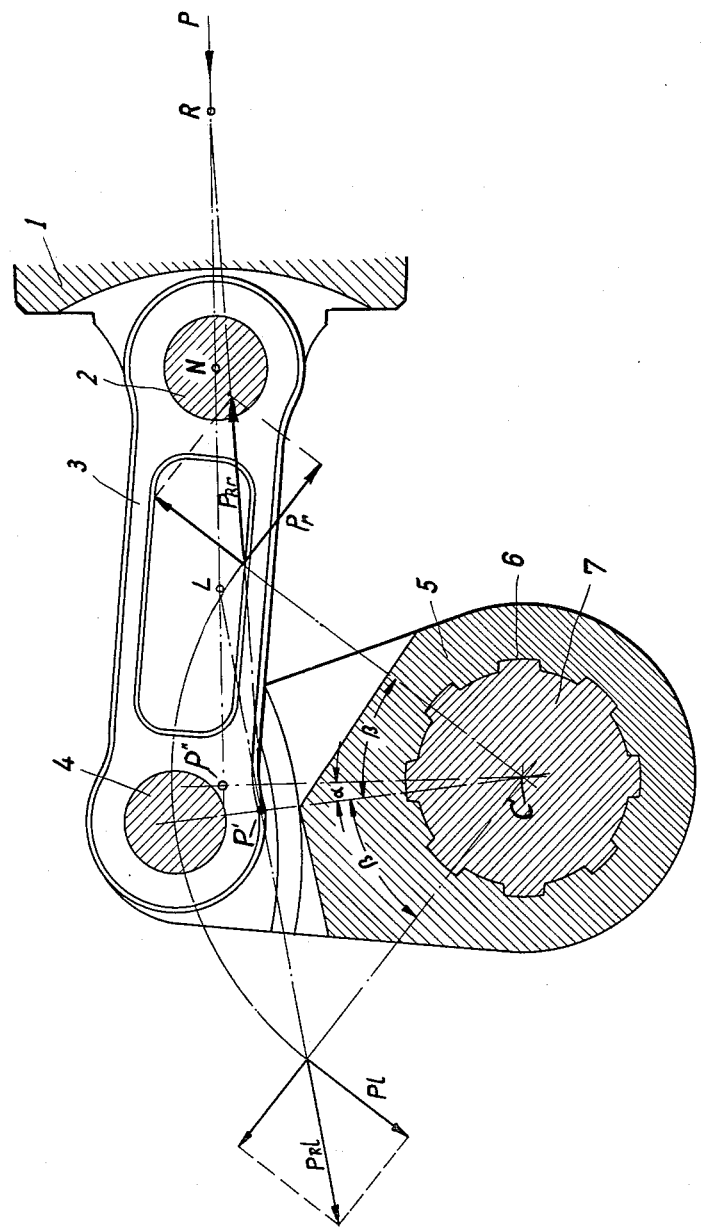
Inventor:
ERICH JABLONSKY
By
ATTY.

United States Patent Office 3,118,310
Patented Jan. 21, 1964

3,118,310
CRANK MECHANISM FOR MANUAL OR POWER
BOOST STEERING ARRANGEMENTS
Erich Jablonsky, Schwabisch Gmund, Germany, assignor
to Zahnradfabrik Friedrichshafen, Aktiengesellschaft,
Friedrichshafen, Germany
Filed Nov. 14, 1960, Ser. No. 69,067
Claims priority, application Germany Apr. 6, 1960
6 Claims. (Cl. 74—105)

This invention relates to steering arrangements and more particularly to the crank arm which operates the steering shaft of a vehicle.

In the usual construction of steering mechanism, either manual or power, a steering shaft is utilized which is rotated by means of a crank arm or crank lever. The crank lever is operated, in the case of manual steering, by a steering nut, or, in the case of power steering, by a double-ended hydraulic cylinder arrangement. In the case of power steering, a connecting rod is pivoted to the piston and also to an end of the crank arm whereby force exerted by the piston via a pivot pin is transmitted through the connecting rod to the crank arm for rotation of the steering shaft. So much is well known and conventional. However, in conventional arrangements of this kind, and where manual steering is used, that is, the connecting rod is pushed or pulled by reciprocation of a so-called steering nut, the forces for moving the crank arm out of its neutral position (wheels straight ahead) to either extreme position and for effecting return of the crank arm from either extreme position of its arc of travel are unequal. This is due to the angular position of the crank arm being in neutral position usually made perpendicular either to the piston axis or to the connecting rod, regardless of the torque exerted on the steering shaft in the extreme positions thereof so that when the connecting rod moves in either direction to push or pull the crank arm for rotation of the steering shaft, the angular relationship which comes into play at either limit of extreme travel, that is, after full left or full right steering, comes out to effect unequal forces acting on the crank arm. In other words, the force for moving the crank arm into and from extreme left steering is not the same as the moving force into and from extreme right steering, and driving safety is impaired and driving characteristics of the vehicle in general are likewise impaired due to the non-uniform torque which is felt at the steering wheel. This is particularly disadvantageous in the case of manual steering.

It is the object of the present invention to overcome this drawback of prior art steering mechanisms and to provide an exceedingly simple arrangement whereby steering torque required for moving and returning the vehicle wheels into and from extreme left or extreme right steering positions are substantially equal.

Briefly, the invention contemplates the balancing out of unequal torques by providing a neutral or "wheels straight ahead" position of the crank arm at a particular angle with respect to the conventional neutral or "wheels straight ahead" position. It has been found that, generally, by advancing the neutral position of the crank arm, to a setting that is not perpendicular to the connecting rod or to the piston axis, respectively, but varies therefrom by a few degrees, a resolution of forces for end position movement of the crank arm results in having effective torque components wherein moving forces into either extreme left or extreme right wheel positions are equal to each other, and return forces from either extreme left or extreme right wheel positions are equal to each other.

The invention is illustrated in the figure of the drawing which shows an elevation in partial section of the crank arm and a steering shaft.

Thus, a power piston 1 is connected by a pin 2 for transmitting forces to a connecting rod 3. Pin 2 pivotally connects the connecting rod to the piston and carries the thrust. The connecting rod 3 exerts force on a pin 4 which pivotally connects to a crank arm 5 splined at 6 to a steering shaft 7 having a center "C."

It will be apparent that movement of piston 1 in either direction will rock crank arm 5 to rotate steering shaft 7. The actual steering links, etc., connected to the shaft 7 are omitted from the drawing inasmuch as they do not form part of the present invention. It will, of course, be appreciated that the piston 1 can be supplanted by any manual mechanism which reciprocates the pin 2 along the line LNR. Thus, reciprocation of the pin 2 in the direction of NR will effect turning the crank arm in a clockwise direction and steering to the right, whereas reciprocation in the direction NL will result in turning the crank arm in an anticlockwise direction and steering to the left. The arrow designated P is illustrative of a force for turning the crank arm 5 in an anticlockwise direction. The particularly novel feature of the invention is the angular setting of the bisecting plane of the crank arm at such an angle alpha with respect to the plane bisecting the steering shaft 7 and perpendicular to the line LNR that the respective torque forces exerted on the steering shaft 7 at either extreme end of travel of arm 5 are equal. Such angle represents the neutral position, i.e., wheels centered position, of crank arm 5. In the embodiment, represented in the drawing, the crank arm in its neutral position leads from the conventional perpendicular position in slightly clockwise position by an amount of about 7°. However, the position of crank arm 5 could also be a lagging position (not shown) as well as the leading position shown.

The magnitude of angle alpha depends on the length of the distance between pins 2 and 4 versus the length of the crank arm, and on the distance $C-P''$, $P''$ being the point of intersection of the piston axis LNR with the bisecting plane of steering shaft 7 perpendicular to LNR.

Now, consider the angles beta, of which two are shown. It will be understood that the angle beta extending to the left of angle alpha terminates in a line which is the extreme leftward steering position, while the angle beta to the right of the angle alpha terminates in a line which is the extreme rightward steering position; such extreme positions being for crank arm 5. Accordingly, considering the diagram of forces involved, the force $P_{r1}$ which is a left-hand steering force is resolved into two components. The component $P_1$, which is tangential to the circle of pin 4 and therefore the effective force acting on the moment arm of crank arm 5, is equal in magnitude to the component $P_r$ of force $P_{Rr}$ which is a right-hand steering force. These two tangential components, $P_r$ and $P_1$ are clearly shown as being equal in length and equal in direction with respect to center line 4—7 in neutral positions. A criterion for the balance of the components $P_1$ and $P_r$ is that the point of intersection $P'$ of the two lines of action of $P_1$ and $P_r$ lies on the bisecting plane of steering shaft 7 in its neutral position.

$P_r$ and $P_1$ are therefore of the same magnitude and since they represent that component acting on shaft 7 for moving the shaft to either extreme limit of steering, it will be apparent that the purpose of the invention has been accomplished.

It will also be noted that the pin 2 moves along the straight line from N to L for moving to extreme left position in which the force component $P_1$ is exerted on shaft 7. Similarly, with regard to the distance NR and the force component $P_r$.

In one special case, where the longitudinal center line of piston 1 lies in the common plane of the two axes of pivotal connection between crank arm 5 and connecting rod 3 in both extreme positions of the steering shaft, the force lines of $P_{Rr}$ and $P_{Rl}$ are at a right angle to the bisecting plane of shaft 7 and the angle alpha becomes zero.

Having thus described my invention, I am aware that various changes may be made without departing from the spirit thereof and, accordingly, I do not seek to be limited to the precise illustration herein given except as set forth in the appended claims.

I claim:

1. The combination of a steering shaft and a crank arm splined thereto, a connecting rod pivotally connected to said crank arm, steering power means longitudinally and reversibly movable for moving said connecting rod and exerting a steering thrust thereon, wherein a line joining the center of said steering shaft and the axis of pivotal connection between said crank arm and said connecting rod is fixed in neutral position for straight ahead steering at a predetermined angle with respect to the plane bisecting said steering shaft and perpendicular to the longitudinal center line of said thrust effecting means, said angle being such as to produce effective tangential thrust components on said steering shaft which are substantially equal in either extreme position of said steering shaft, said crank arm being reversibly rotative with respect to said neutral position corresponding to reversible movement of said steering power means.

2. In a device as set forth in claim 1, said angle being rotatively leading, with respect to said plane bisecting said steering shaft and perpendicular to the direction of the line of thrust.

3. In a device as set forth in claim 1, said angle being rotatively lagging with respect to a plane intersecting said steering shaft axis and perpendicular to the direction of the line of thrust.

4. In a device as set forth in claim 3, said angle being of the order of 7°.

5. In a device as set forth in claim 1, the two lines of said tangential thrust components effective on said steering shaft in ether extreme position thereof intersecting each other in the bisecting plane of said steering shaft in the neutral position thereof.

6. In a device as set forth in claim 1, said angle being zero and the longitudinal center line of said thrust effecting means lying in the common plane of the two axes of pivotal connection between said crank arm and said connecting rod in both extreme positions of said steering shaft.

References Cited in the file of this patent

UNITED STATES PATENTS

| | | |
|---|---|---|
| 2,395,911 | Schoenfeld | Mar. 5, 1946 |
| 2,865,215 | Bishop | Dec. 23, 1958 |
| 2,865,216 | Bishop | Dec. 23, 1958 |

OTHER REFERENCES

Ham and Crane, Mechanics of Machinery; McGraw-Hill Book Co., 1948, p. 308, Sec. 186.